United States Patent
Ji et al.

(10) Patent No.: US 12,223,961 B2
(45) Date of Patent: Feb. 11, 2025

(54) MEETING MANAGING METHOD, SERVER AND MEETING MANAGING SYSTEM

(71) Applicants: Beijing BOE Display Technology Co., Ltd., Beijing (CN); BOE Technology Group Co., Ltd., Beijing (CN)

(72) Inventors: Xu Ji, Beijing (CN); Dacheng Zhou, Beijing (CN)

(73) Assignees: Beijing BOE Display Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/607,825

(22) PCT Filed: Dec. 24, 2020

(86) PCT No.: PCT/CN2020/138833
§ 371 (c)(1),
(2) Date: Oct. 29, 2021

(87) PCT Pub. No.: WO2022/133854
PCT Pub. Date: Jun. 30, 2022

(65) Prior Publication Data
US 2023/0317081 A1  Oct. 5, 2023

(51) Int. Cl.
*G10L 17/22* (2013.01)
*G10L 15/22* (2006.01)
(Continued)

(52) U.S. Cl.
CPC ............ *G10L 15/26* (2013.01); *G10L 15/22* (2013.01); *H04L 12/1831* (2013.01); *H04L 51/10* (2013.01); *H04L 51/234* (2022.05)

(58) Field of Classification Search
CPC ... G10L 15/22; G10L 17/00; G10L 2015/225; G10L 15/26; G10L 15/30; G06F 3/167;
(Continued)

(56) References Cited

U.S. PATENT DOCUMENTS 10,248,934 B1   4/2019  Shen et al.
12,095,585 B2*  9/2024  Ji .................... H04L 12/1895
(Continued)

FOREIGN PATENT DOCUMENTS

CN   108597518 A   9/2018
CN   108600687 A   9/2018
(Continued)

OTHER PUBLICATIONS

Liang, Machine translation of chinese WIPO publication WO 2021143034 A1, filed Jun. 5, 2020, published Jul. 22, 2021, pp. 1-22 (Year: 2021).*
(Continued)

*Primary Examiner* — Olujimi A Adesanya
(74) *Attorney, Agent, or Firm* — IPro, PLLC (57) ABSTRACT

A meeting managing method, a server and a meeting managing system, and relates to the technical field of computers. The method according to the present application includes receiving data of a plurality of participants sent by a first client; binding data of each participant in the plurality of participants with a corresponding electronic-table-card identifier, wherein electronic table cards corresponding to each of the electronic-table-card identifiers correspond to microphones one to one; receiving the voice data sent by the target microphone; according to a target-electronic-table-card identifier corresponding to the target microphone, determining data of the target participant; and according to the voice data and the data of the target participant, generating a meeting document. According to the one-to-one correspondence relation between the participant data, the electronic table cards and the microphones, the data of the target participant corresponding to the voice data is determined, the meeting document is generated accordingly.

17 Claims, 5 Drawing Sheets

(51) Int. Cl.
*G10L 15/26* (2006.01)
*H04L 12/18* (2006.01)
*H04L 51/10* (2022.01)
*H04L 51/234* (2022.01)

(58) Field of Classification Search
CPC .. G06F 3/016; G06F 2203/0383; G06F 21/32; G06F 3/011
See application file for complete search history.

(56) References Cited

U.S. PATENT DOCUMENTS

| | | | | |
|---|---|---|---|---|
| 2016/0357489 | A1* | 12/2016 | Dong | H04N 7/142 |
| 2019/0108221 | A1* | 4/2019 | Nelson | G10L 15/26 |
| 2019/0294804 | A1* | 9/2019 | Di Lella | G06F 21/6209 |
| 2020/0042273 | A1* | 2/2020 | Dong | G06F 1/1673 |
| 2020/0294500 | A1* | 9/2020 | Ferris | G10L 15/22 |
| 2021/0160242 | A1* | 5/2021 | McKnight | H04L 63/102 |

FOREIGN PATENT DOCUMENTS

| | | |
|---|---|---|
| CN | 110210835 A | 9/2019 |
| CN | 110232925 A | 9/2019 |
| CN | 110365933 A | 10/2019 |
| CN | 110533382 A | 12/2019 |
| CN | 111045733 A | 4/2020 |
| CN | 111243590 A | 6/2020 |
| CN | 111277589 A | 6/2020 |
| CN | 210666517 U | 6/2020 |
| CN | 111401699 A | 7/2020 |
| CN | 210986246 U | 7/2020 |
| CN | 112086013 A | 12/2020 |
| JP | 2002101205 A | 4/2002 |
| JP | 2004287201 A | 10/2004 |

OTHER PUBLICATIONS

Hsiao, Machine translation of Taiwanese patent publication Tw M449334 U, published Mar. 21, 2013, pp. 1-8 (Year: 2013).*
Ma, Machine translation of Chinese patent publication CN 110503736 A, published Nov. 26, 2019, pp. 1-17 (Year: 2019).*
Tang, Machine translation of Chinese patent publication CN 109586935 A, published Apr. 5, 2019, pp. 1-9 (Year: 2019).*
Hirano et al, Machine translation of Japanese patent publication JP2009086207 A, published Apr. 23, 2009, pp. 1-11 (Year: 2009).*
Huang et al, Machine translation of Chinese patent publication CN 111212259 A, published, May 29, 2020, pp. 1-22 (Year: 2020).*
Wang, Machine translation of Chinese application CN 202694719 U, filed Jul. 9, 2012, published Jan. 23, 2013, pp. 1-3 (Year: 2013).*
CN2020800035803 first office action dated Dec. 21, 2024.

* cited by examiner

MEETING MANAGING METHOD, SERVER AND MEETING MANAGING SYSTEM

TECHNICAL FIELD

The present application relates to the technical field of computers, and particularly relates to a meeting managing method, a server and a meeting managing system.

BACKGROUND

With the social development, the quantities of the employees of enterprises highly increase. In enterprises, meetings have already become an important approach for the communication between employees in routine work. In order to assign tasks, increase the projection operation efficiency and so on, different meetings are held periodically, so that all of the participants can know the development plan of the company in time.

During the proceeding of the meeting, the participants perform discussion on the meeting topic on the meeting, and, after the meeting has ended, a worker that specially takes charge of recording is required, to manually collate the meeting contents of the meeting. However, that costs a large amount of working time of the worker, the collation of the meeting contents has a low efficiency, and the key contents of the meeting might be recorded incompletely.

SUMMARY

The embodiments of the present application provide a meeting managing method, a server and a meeting managing system, to solve the problems in the prior art that the manual collation of the meeting contents costs a large amount of working time of the worker, the collation of the meeting contents has a low efficiency, and the key contents of the meeting might be recorded incompletely.

In order to solve the above problems, the present application discloses a meeting managing method, wherein the method is applied to a server, and the method comprises:

receiving data of a plurality of participants sent by a first client;

binding data of each participant in the plurality of participants with a corresponding electronic-table-card identifier, wherein electronic table cards corresponding to each of the electronic-table-card identifiers correspond to microphones one to one;

receiving voice data collected by at least one target microphone;

according to a target-electronic-table-card identifier of a target electronic table card corresponding to the target microphone, determining data of a target participant bound with the target-electronic-table-card identifier; and according to the voice data and the data of the target participant, generating a meeting document.

In order to solve the above problems, the present application further discloses a server, wherein the server comprises:

a participant-data receiving module configured for receiving data of a plurality of participants sent by a first client;

a data binding module configured for binding data of each participant in the plurality of participants with a corresponding electronic-table-card identifier, wherein electronic table cards corresponding to each of the electronic-table-card identifiers correspond to microphones one to one;

a voice-data receiving module configured for receiving voice data collected by at least one target microphone;

a target-participant-data determining module configured for, according to a target-electronic-table-card identifier of a target electronic table card corresponding to the target microphone, determining data of a target participant bound with the target-electronic-table-card identifier; and a meeting-document generating module configured for, according to the voice data and the data of the target participant, generating a meeting document.

In order to solve the above problems, the present application further discloses a server, wherein the server comprises a processor, a memory and a computer program that is stored in the memory and is executable in the processor, and the computer program, when executed by the processor, implements the steps of the meeting managing method stated above.

In order to solve the above problems, the present application further discloses a computer program, wherein the computer program comprises a computer-readable code, and when the computer-readable code is executed on a server, the computer-readable code causes the server to implement the steps of the meeting managing method stated above.

In order to solve the above problems, the present application further discloses a computer-readable medium, wherein the computer-readable medium stores the computer program stated above.

In order to solve the above problems, the present application further discloses a meeting managing system, wherein the system comprises electronic table cards, a microphone, a first client and the server stated above;

the electronic table cards are configured for displaying participant data bound with electronic-table-card identifiers corresponding to the electronic table cards;

the microphone is configured for collecting voice data emitted by a target participant corresponding to the data of the target participant; and the first client is configured for sending the data of the plurality of participants to the server.

Optionally, the meeting managing system further comprises a second client, a third client and a fourth client;

the second client is configured for sending to the server a target message and data of a specified-participant corresponding to the target message, and receiving a receipt message sent by the server;

the third client is configured for sending to the server one or more tasks to be executed for the meeting document and executor data corresponding to a task executor specified for each of the tasks to be executed;

the fourth client is configured for receiving the task to be executed sent by the server, and sending to the server a task progress of the task to be executed;

the first client is further configured for sending participant-changing data to the server; and the electronic table cards are further configured for displaying the target message and the task to be executed sent by the server; and sending a receipt message to the server, and/or, according to a controlling instruction sent by the server, controlling an indicator lamp on the electronic table card to emit light.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art can obtain other figures according to these figures without paying creative work.

DETAILED DESCRIPTION

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
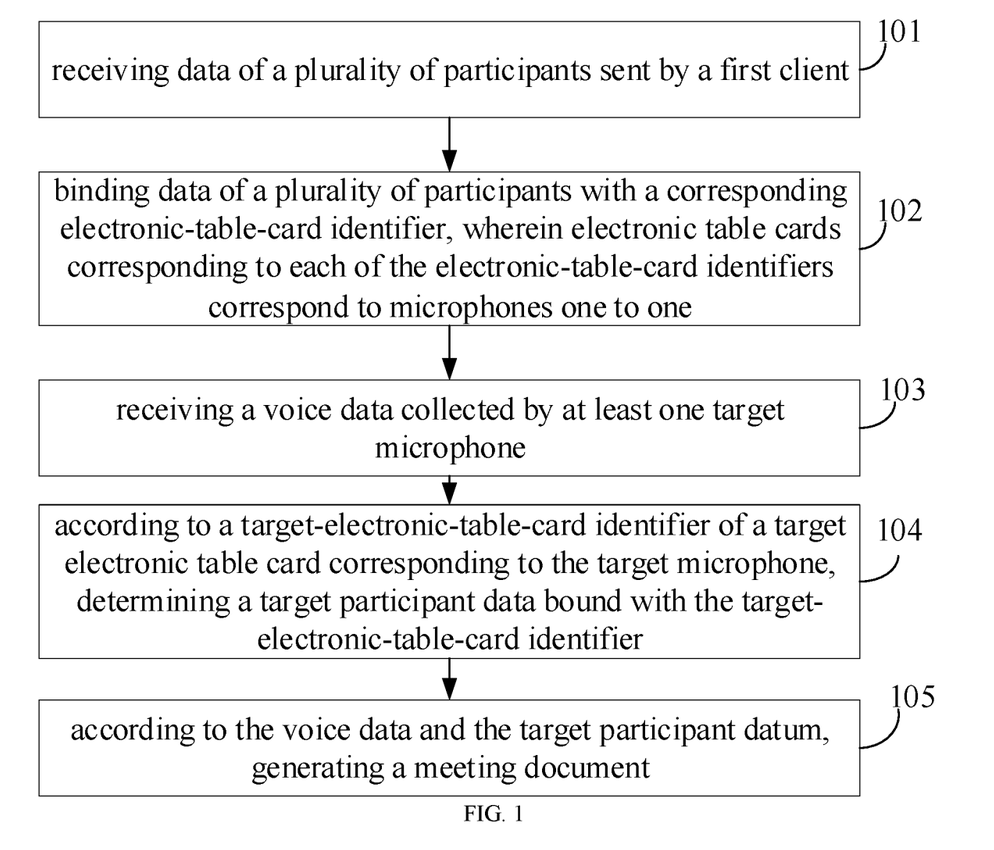
FIG. 1 schematically shows a flow chart of the meeting managing method according to an embodiment of the present application.

Referring to FIG. 1, FIG. 1 shows a flow chart of the meeting managing method according to an embodiment of the present application, wherein the method is applied to a server, and may particularly comprise the following steps:

Step 101: receiving data of a plurality of participants sent by a first client.

In an embodiment of the present application, a worker operates on the first client, whereby the first client sends to a server a request for logging in on a meeting managing page. The server, according to the received logging-in request, returns a logging-in page corresponding to the meeting managing page to the first client. The first client, after receiving the logging-in page, displays the logging-in page. The worker enters identity data in the logging-in page, wherein the identity data include data such as the user name and the password. Subsequently, the first client sends the identity data to the server. The server verifies the identity data sent by the first client. After the verification has passed, the server sends the meeting managing page to the first client. The first client, after receiving the meeting managing page, displays the meeting managing page.

Figure 2:
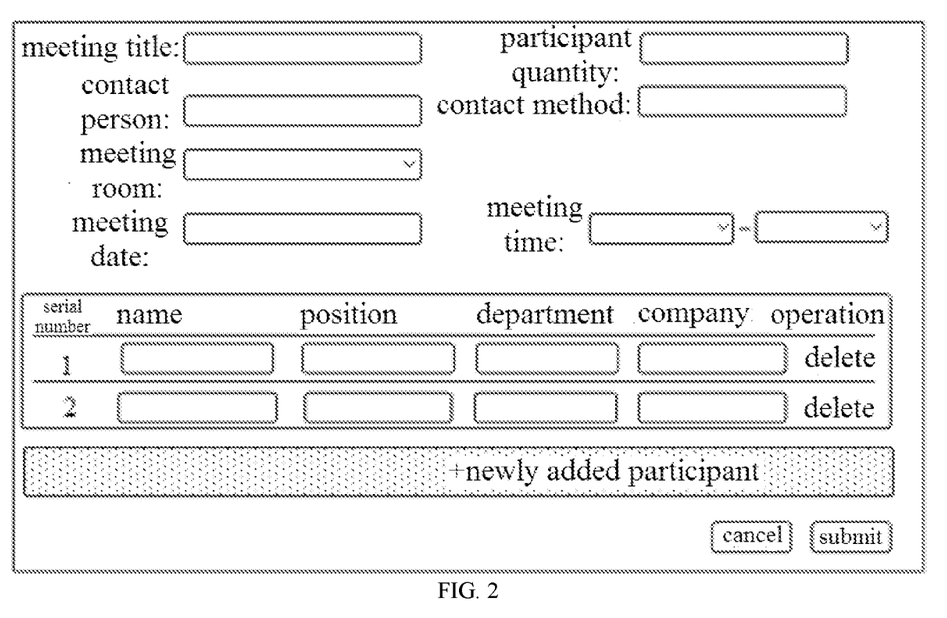
FIG. 2 schematically shows a schematic diagram of the meeting appointing page for adding participant data according to an embodiment of the present application.

If the worker performs meeting appointment in the meeting managing page, then the page skips to the meeting appointing page shown in FIG. 2. The meeting appointing page contains a meeting-title input box, a contact-person input box, an allocated-meeting-room choice box, a meeting-date input box, a participant-quantity input box, a contact-method input box and a meeting-time input box. The worker enters into the meeting-title input box the meeting title corresponding to the meeting to be held; enters into the contact-person input box the corresponding contact name; selects in the allocated-meeting-room choice box the meeting room where the meeting is to be held; enters into the meeting-date input box the corresponding meeting holding date, wherein the format of the meeting holding date is yy-mm-dd, and, for example, the meeting holding date is 2020-12-09; enters into the participant-quantity input box the quantity of the participants participating in the meeting; enters into the contact-method input box the contact phone number corresponding to the contact person; and enters into the meeting-time input box the meeting holding times, wherein the meeting holding times include the meeting starting time and the meeting ending time, their format is hh:mm, and, for example, the meeting starting time is 14:00, and the meeting ending time is 15:30.

Furthermore, the meeting appointing page shown in FIG. 2 further displays data input boxes corresponding to the participant, which include a participant-name input box, a participant-position input box, a participant-department input box, a participant-company input box, and so on. The worker enters into the participant-name input box the name of the participant participating in the meeting; enters into the participant-position input box the position of the participant; enters into the participant-department input box the title of the department that the participant belongs to; and enters into the participant-company input box the name of the company that the participant belongs to. Moreover, the meeting appointing page may further display a participant-mailbox input box, and the worker may enter into the participant-mailbox input box the mailbox account of the participant.

Moreover, the meeting appointing page shown in FIG. 2 further displays a deletion control, a participant-addition control, a canceling control and a submitting control. By performing a triggering operation to the deletion control, corresponding data of the participant may be deleted. By performing a triggering operation to the participant-addition control, a data input box corresponding to the participant may be newly added. By performing a triggering operation to the canceling control, the meeting appointed this time may be canceled. Moreover, by performing a triggering operation to the submitting control, the data that are inputted in the meeting appointing page may be sent to the server.

Accordingly, the first client may receive the data of the plurality of participants that are inputted by the worker in the meeting appointing page, wherein the data of the participant include the participant name, the mailbox account of the participant, the participant position, the department that the participant belongs to and the company that the participant belongs to. Subsequently, the first client receives the touch-controlling operation on the submitting control by the worker, and sends data of the plurality of participants to the server, and accordingly the server receives data of the plurality of participants sent by the first client.

For example, the server receives the data of 4 participants sent by the first client, wherein the first participant data contains the participant name of "Zhang San", the second participant data contains the participant name of "Li Si", the third participant data contains the participant name of "Wang Wu", and the fourth participant data contains the participant name of "Zhao Liu".

The first client according to the embodiment of the present application may be a browser or application program deployed in a terminal device, wherein the application program refers to an application program for meeting management.

Step 102: binding data of each participant in the plurality of participants with a corresponding electronic-table-card identifier, wherein electronic table cards corresponding to each of the electronic-table-card identifiers correspond to microphones one to one.

In an embodiment of the present application, after the server has received the data of the plurality of participants sent by the first client, the server randomly binds data of each of the participants with an unused electronic-table-card identifier, wherein electronic table cards corresponding to each of the electronic-table-card identifiers correspond to microphones one to one.

In the practical product, the electronic table card and the microphone may be two mutually independent devices, and each of the microphones has a unique microphone identifier. Accordingly, it is required to bind in advance each of the electronic-table-card identifiers with the corresponding microphone identifier, thereby realizing that the electronic table cards corresponding to each of the electronic-table-card identifiers correspond to the microphones one to one. At this point, the data of the participant, the electronic-table-card identifiers and the microphone identifiers have been bound one to one.

Certainly, the microphone may be provided on the electronic table card; in other words, the electronic table card and the microphone are of an integral structure. In this case, the electronic table cards and the microphones correspond one to one, and, by binding the data of the participant with the electronic-table-card identifiers, the data of the participant, the electronic table cards and the microphones can correspond one to one.

For example, the unused electronic-table-card identifiers include an electronic-table-card identifier A1, an electronic-table-card identifier A2, an electronic-table-card identifier A3, an electronic-table-card identifier A4, an electronic-table-card identifier A5 and an electronic-table-card identifier A6. The participant name "Zhang San" is bound with the electronic-table-card identifier A1, the participant name "Li Si" is bound with the electronic-table-card identifier A2, the participant name "Wang Wu" is bound with the electronic-table-card identifier A3, and the participant name "Zhao Liu" is bound with the electronic-table-card identifier A4. Furthermore, the electronic-table-card identifier A1 is further bound with a microphone identifier B1, the electronic-table-card identifier A2 is further bound with a microphone identifier B2, the electronic-table-card identifier A3 is further bound with a microphone identifier B3, and the electronic-table-card identifier A4 is further bound with a microphone identifier B4.

If the electronic table card and the microphone are two mutually independent devices, in the practical usage, the binding relation between the electronic-table-card identifiers and the microphone identifiers may also be modified. In this case, the worker, in the meeting managing page displayed by the first client, modifies the binding relation between the electronic-table-card identifiers and the microphone identifiers. Accordingly, the first client sends the modification request to the server. The server, according to the modification request, modifies the binding relation between the electronic-table-card identifiers and the microphone identifiers.

For example, the worker modifies the binding relation between the electronic-table-card identifier A1 and the microphone identifier B1, which comprises unbinding the electronic-table-card identifier A1 and the microphone identifier B1, and newly binding the electronic-table-card identifier A1 with the microphone identifier B5. Therefore, the server, after receiving the modification request sent by the first client, unbinds the electronic-table-card identifier A1 and the microphone identifier B1, and newly binds the electronic-table-card identifier A1 with the microphone identifier B5 that have been unbound.

It should be noted that both of the process executed in the step 101 of receiving data of the plurality of participants sent by the first client and the process executed in the step 102 of binding the data of the participant with the electronic-table-card identifiers are performed before the meeting begins. Certainly, according to practical usage demands, the server may also receive the data of the participant sent by the first client and bind the data of the participant with the electronic-table-card identifiers during the proceeding of the meeting.

Step 103: receiving voice data collected by at least one target microphone.

In an embodiment of the present application, after the data of the participant and the electronic-table-card identifiers have been bound, the worker places, according to the practically required placing positions, the electronic table cards corresponding to the electronic-table-card identifiers and the microphones corresponding to the microphone identifiers, or the electronic table cards integrated with the microphones.

Before the meeting begins, when the time difference from the meeting starting time is equal to a preset time difference, the server sends the data of the participant bound with each of the electronic-table-card identifiers to the electronic table card corresponding to that electronic-table-card identifier, and the electronic table card displays the corresponding data of the participant, for example, displaying the participant name, the position of the participant, the title of the department that the participant belongs to, and so on. Before the meeting begins, by displaying the data of the participant by using the electronic table cards, it is ensured that the participants sit at the correct positions. The preset time difference may be set artificially, for example, 10 minutes, 30 minutes and so on.

For example, the meeting starting time is 14:00, and, when the time difference from the meeting starting time is equal to the preset time difference, 10 minutes, i.e., on 13:50, the server sends the data of the participant to the electronic table cards, and the electronic table cards display the data of the participant.

During the proceeding of the meeting, at least one target participant makes a speech with respect to the meeting topic. Accordingly, a target microphone at the position where the target participant is located collects the voice data emitted by the target participant. Subsequently, the target microphone sends the voice data to the server. The server receives the voice data collected by at least one target microphone. The target participant refers to the participant among the plurality of participants participating in the meeting that makes a speech, and the target microphone refers to the microphone that collects the voice data of the target participant.

The electronic table card according to the embodiments of the present application may be an electronic ink-screen table card, which communicates with the server via a gateway. The communication mode may be Wi-Fi (Wireless Fidelity), 433MHZE (a wireless transmission communication) and so on, and the embodiments of the present application do not limit the communication mode between the electronic table cards and the server.

Step 104: according to a target-electronic-table-card identifier of a target electronic table card corresponding to the target microphone, determining data of the target participant bound with the target-electronic-table-card identifier.

In an embodiment of the present application, after the server has received the voice data sent by the target microphone, the server, according to the one-to-one correspondence relation between the microphones and the electronic table cards, determines the target-electronic-table-card identifier of the target electronic table card corresponding to the target microphone, and in turn determines data of the target participant bound with the target-electronic-table-card identifier, i.e., identifying the target participant corresponding to each of the voice data.

For example, if the electronic table card and the microphone are two mutually independent devices, and the target microphone identifier corresponding to the target microphone that collects the voice data is the microphone identifier B2, then it is determined that the target-electronic-table-card identifier bound with the target microphone identifier B2 is the electronic-table-card identifier A2, and in turn it is determined that the participant name in the data of the target participant bound with the target-electronic-table-card identifier A2 is "Li Si". Certainly, data in the data of the target participant bound with the target-electronic-table-card identifier A2 such as the mailbox account of the participant, the participant position, the title of the department that the participant belongs to and the title of the company that the participant belongs to may further be determined.

Step 105: according to the voice data and the data of the target participant, generating a meeting document.

In an embodiment of the present application, after determining the data of the target participant, the server, according to the voice data collected by the target microphone and the data of the target participant, generates a meeting document.

Particularly, the server generates the meeting document by automatically adding the data of the target participant preceding each of the voice data. Therefore, in the meeting document, the data of the target participant corresponding to each of the voice data is automatically marked, which prevents that, subsequently in the viewing of the meeting document, the target participant corresponding to each of the voice data is not clearly known, and enables the generated meeting document to be clearer. Furthermore, that also prevents the problem that the worker does not clearly know the name of the speaker corresponding to each of the voice data, and thus cannot artificially and manually add the data of the target participant corresponding to each of the voice data.

This step may comprise, during the proceeding of the meeting, receiving in real time the voice data collected by the target microphone, determining the data of the target participant corresponding to the target participant that emits the voice data, adding the data of the target participant preceding each of the voice data, generating, in the time sequence, the meeting document containing each of the voice data and the corresponding data of the target participant, and storing the meeting document in the server.

Optionally, after the step 105, the method further comprises: according to the meeting document, extracting associated-user data corresponding to an associated user associated with this meeting, wherein the associated-user data contains the data of the participant and user data corresponding to a user involved in the meeting; and according to the associated-user data, sending the meeting document.

In an embodiment of the present application, the server, after generating the meeting document, may, according to the meeting document, automatically extract an associated-user data corresponding to an associated user associated with this meeting. Particularly, the data of the participant corresponding to the meeting document may be automatically extracted from the server, wherein the data of the participant are sent by the first client and stored in the server, in which case the associated users refer to the participants participating in this meeting. This step may also comprise automatically acquiring from the meeting document the user data corresponding to the users mentioned in this meeting, and using the user names corresponding to the users mentioned in this meeting and the other data corresponding to the user names as the associated-user data, for example, using the data such as the user names, the user genders, and the titles of the departments of the users belong to as the associated-user data, in which case the associated users refer to the users mentioned in this meeting.

Subsequently, the server, according to the associated-user data, sends the meeting document to the clients corresponding to the associated users, and accordingly the associated users may view the meeting document at the respective corresponding clients.

Certainly, the server, after generating the meeting document, may also merely store the meeting document, and the associated users may log in on the meeting managing page, and send to the server a request of viewing the meeting document, to view the meeting document.

After the meeting has ended, the worker, by using the first client, logs in on the meeting managing page, operates in the meeting managing page, and sends to the server a request of viewing the meeting document. The server, according to the viewing request, returns the meeting document to the first client. The first client, after receiving the meeting document sent by the server, displays the meeting document. The worker collates the meeting document in the first client, and extracts the key contents in the meeting document, thereby obtaining a minutes of meeting. The first client then sends the finally generated minutes of meeting to the server. Subsequently, the server may send the minutes of meeting according to the determined associated-user data. Alternatively, the associated users may, by using the respective clients, log in on the meeting managing page, and send to the server a request of viewing the minutes of meeting, to view the minutes of meeting.

In the embodiments of the present application, the data of the participant and the electronic-table-card identifiers are in advance bound, and the electronic table cards corresponding to the electronic-table-card identifiers correspond to the microphones one to one; during the proceeding of the meeting, according to the target microphone that sends the voice data, the target-electronic-table-card identifier of the target electronic table card corresponding to the target microphone is determined, and in turn the data of the target participant of the target participant that emits the voice data is determined; and, finally, according to the data of the target participant and the voice data, the meeting document is directly generated. The generated meeting document does not require the worker to manually collate, which saves the working time of the worker, increases the efficiency of the collation of the meeting document, and prevents incomplete recording of the meeting contents. Furthermore, the target participant corresponding to each of the voice data can be identified, and in the meeting document, the data of the target participant corresponding to each of the voice data can be automatically marked, which prevents that, subsequently in the viewing of the meeting document, the target participant corresponding to each of the voice data is not clearly known, and enables the generated meeting document to be clearer.

Figure 3:
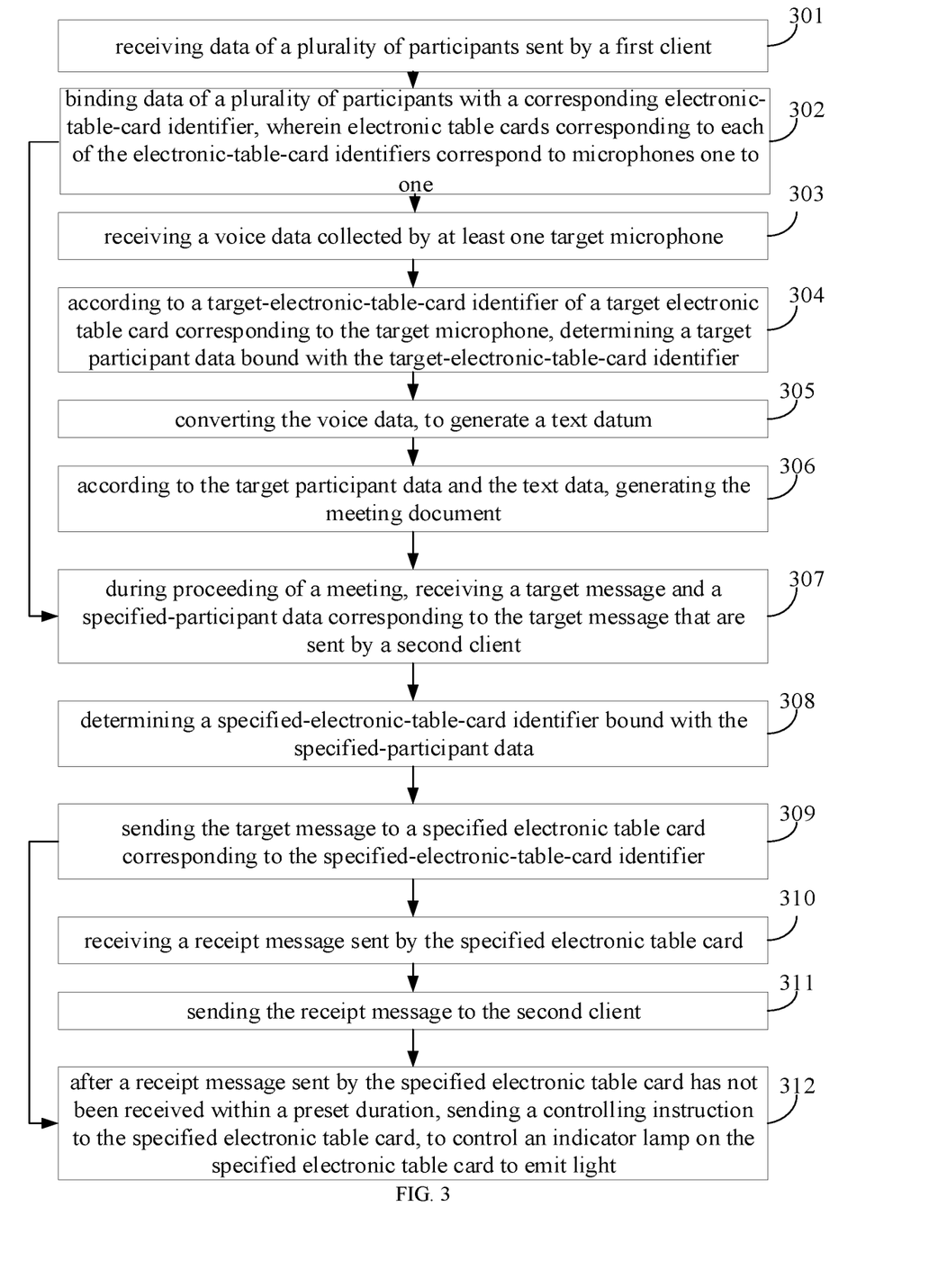
FIG. 3 schematically shows a flow chart of the meeting managing method according to another embodiment of the present application.

Referring to FIG. 3, FIG. 3 shows a flow chart of the meeting managing method according to another embodiment of the present application, wherein the method is applied to a server, and may particularly comprise the following steps:

Step 301: receiving data of a plurality of participants sent by a first client.

This step has a principle similar to that of the step 101, and is not discussed here further.

Step 302: binding data of each participant in the plurality of participants with a corresponding electronic-table-card identifier, wherein electronic table cards corresponding to each of the electronic-table-card identifiers correspond to microphones one to one.

In an embodiment of the present application, the server randomly binds each of the data of the participant with an unused electronic-table-card identifier, and the electronic table cards corresponding to the electronic-table-card identifiers correspond to the microphones one to one. In this case, the data of the participant, the electronic table cards and the microphones correspond one to one.

Optionally, before the step 303, the method further comprises: receiving participant-changing data sent by the first client, wherein the participant-changing data contains a target-input-box identifier and data of the participant that has been changed that is inputted in a target input box corresponding to the target-input-box identifier; and modifying data of the participant to be changed that is in advance inputted in the target input box corresponding to the target-input-box identifier into the data of the participant that has been changed, and binding the data of the participant that has been changed with an electronic-table-card identifier corresponding to the data of the participant to be changed.

In an embodiment of the present application, before the meeting begins or during the proceeding of the meeting, if the participants change temporarily, the worker logs in on the meeting managing page by using the first client, skips from the meeting managing page to the meeting appointing page, deletes the data of the participant to be changed in the target input box of the meeting appointing page, and newly enters the data of the participant that has been changed. The first client sends to the server the target-input-box identifier corresponding to the target input box and the data of the participant that has been changed that is newly inputted in the target input box. The server, according to the target-input-box identifier, determines the data of the participant to be changed that is previously inputted in the target input box corresponding to the target-input-box identifier, then modifies the data of the participant to be changed into the data of the participant that has been changed, and binds the data of the participant that has been changed with the electronic-table-card identifier corresponding to the data of the participant to be changed, at which point the data of the participant to be changed and the electronic-table-card identifier corresponding to it are also correspondingly unbound.

For example, the target-input-box identifier sent by the first client to the server is the target-input-box identifier 1, the data of the participant that has been changed contains the participant name of "Li Er", the participant name that is previously inputted in the target input box corresponding to the target-input-box identifier 1 is "Zhang San", and the participant name "Zhang San" is bound with the electronic-table-card identifier A1. Accordingly, the server modifies the data of the participant from the data corresponding to "Zhang San" into the data corresponding to "Li Er", and binds the participant name "Li Er" with the electronic-table-card identifier A1.

Before the meeting begins, the data of the participant sent by the server to the electronic table card is the data of the participant that has been changed, and the electronic table card displays the data of the participant that has been changed. In the prior art, the data of the participant is exhibited by using a paper table card, and when the data of the participant is changed, it is required to newly print a paper table card and replace the paper table card. However, in the embodiment of the present application, the data of the participant is displayed by using the electronic table card, and when the participants change, it is merely required to send a message by the server to the electronic table card to modify the displayed content of the electronic table card, which has a simple operation and does not cause waste.

Subsequently, in the determination of the speaker name corresponding to the voice data, the data of the participant that has been changed is acquired, and, according to the data of the participant that has been changed and the voice data, the meeting document is generated, which has better flexibility and practical applicability.

Step 303: receiving voice data collected by at least one target microphone.

This step has a principle similar to that of the step 103, and is not discussed here further.

Step 304: according to a target-electronic-table-card identifier of a target electronic table card corresponding to the target microphone, determining data of the target participant bound with the target-electronic-table-card identifier.

This step has a principle similar to that of the step 104, and is not discussed here further.

Step 305: converting the voice data, to generate text data.

In an embodiment of the present application, after the server has received the voice data sent by the microphone, the server, by using the technique of speech conversion, identifies the voice data, and converts the voice data into text data.

Optionally, the server converts the voice data according to a predetermined language type, to generate the text data corresponding to the predetermined language type. The predetermined language type may be predetermined artificially, and it may be one or more types. Alternatively, the server converts the voice data according to the target language types corresponding to the received voice data sent by all of the target microphones, to generate the text data corresponding to the target language types.

For example, the predetermined language types are English and Chinese, and the text data generated by converting the voice data include text data whose language type is English and text data whose language type is Chinese. Alternatively, the target language types corresponding to the voice data sent by all of the target microphones received by the server include English, Chinese and Korean, and accordingly the text data generated by converting the voice data include text data whose language type is English, text data whose language type is Chinese and text data whose language type is Korean.

Step 306: according to the data of the target participant and the text data, generating the meeting document.

In an embodiment of the present application, after converting the voice data to generate the text data, the server generates the meeting document according to the data of the target participant and the text data.

Step 307: during proceeding of a meeting, receiving a target message and data of a specified-participant corresponding to the target message that are sent by a second client.

In an embodiment of the present application, during the proceeding of the meeting, the participants generally do not view the mobile-phone messages in time. When there is an event to be handled and it is required to notify a specified participant, in order to prevent disturbing the meeting order, the message sender, by using a second client, logs in on the meeting managing page, and the message sender finds in the meeting managing page the data of the specified participant participating in the meeting, and enters in the meeting managing page the target message to be notified. Accordingly, the second client sends to the server the inputted target message and the selected data of specified-participant. The server receives the target message and the data of the specified-participant corresponding to the target message that are sent by the second client. The process of logging in on the second client is similar to the process of logging in on the first client, and is not discussed here further.

The second client may be a browser or application program deployed in a terminal device, wherein the application program may be an application program for meeting management.

Step 308: determining a specified-electronic-table-card identifier bound with the data of the specified-participant.

In an embodiment of the present application, after the server has received the target message and the data of the specified-participant corresponding to the target message sent by the second client, the server, according to the binding relation between the data of the participant and the electronic-table-card identifiers, determines a specified-electronic-table-card identifier bound with the data of the specified-participant.

For example, if the data of the specified-participant contains the participant name of "Wang Wu", then it is determined that the specified-electronic-table-card identifier bound with the data of the specified-participant is the electronic-table-card identifier A3.

Step 309: sending the target message to a specified electronic table card corresponding to the specified-electronic-table-card identifier.

In an embodiment of the present application, after the server has determined the specified-electronic-table-card identifier bound with the data of the specified-participant, the server sends the target message to the specified electronic table card corresponding to the specified-electronic-table-card identifier. The specified electronic table card, after receiving the target message, displays the target message on the display screen of the specified electronic table card.

Each of the electronic table cards comprises two display screens that are arranged oppositely, wherein the display screen that faces away from the participant displays the data of the participant, while the display screen that faces the participant displays the data of the participant or contents related to the meeting such as the topic. Moreover, the specified electronic table card, after receiving the target message sent by the server, displays the target message on the display screen that faces the participant, to replace the contents previously displayed.

Step 310: receiving a receipt message sent by the specified electronic table card.

In an embodiment of the present application, the base of each of the electronic table cards is provided with two replying buttons, which are a first replying button and a second replying button, wherein the first replying button is used to send to the server a confirming message, and the second replying button is used to send to the server a rejecting message.

After the specified electronic table card has displayed the target message on its display screen, if the specified participant sees the target message, he may perform a pressing operation by using the replying buttons provided on the specified electronic table card, to make a simple opinion replying. Subsequently, the specified electronic table card sends to the server a receipt message of the specified participant. The server receives the receipt message sent by the specified electronic table card.

Step 311: sending the receipt message to the second client.

In an embodiment of the present application, after the server has received the receipt message sent by the specified electronic table card, the server returns the receipt message to the second client. The second client, after receiving the receipt message, displays the receipt message. Accordingly, the message sender can know the opinion of handling the event to be handled of the specified participant from the receipt message.

Step 312: after a receipt message sent by the specified electronic table card has not been received within a preset duration, sending a controlling instruction to the specified electronic table card, to control an indicator lamp on the specified electronic table card to emit light.

In an embodiment of the present application, after the server has sent the target message to the specified electronic table card, the display screen of the specified electronic table card displays the target message. If the server does not receive, within a preset duration, the receipt message sent by the specified electronic table card, then the server determines that the specified participant did not see the target message in time, and accordingly the server sends a controlling instruction to the specified electronic table card. The specified electronic table card, after receiving the controlling instruction, controls an indicator lamp provided on the specified electronic table card to emit light, to notify the specified participant to view the target message by using the light emission of the indicator lamp provided on the specified electronic table card.

In the practical product, the indicator lamp is provided on the one side of each of the electronic table cards that faces the participant. Furthermore, controlling the indicator lamp provided on the specified electronic table card to emit light may be controlling the indicator lamp to flicker at a constant frequency, and may also be controlling the indicator lamp to continue being lightened.

It should be noted that the step 307 to the step 312 are executed during the proceeding of the meeting, and they have no fixed sequence with the step 303 to the step 306.

Figure 4:
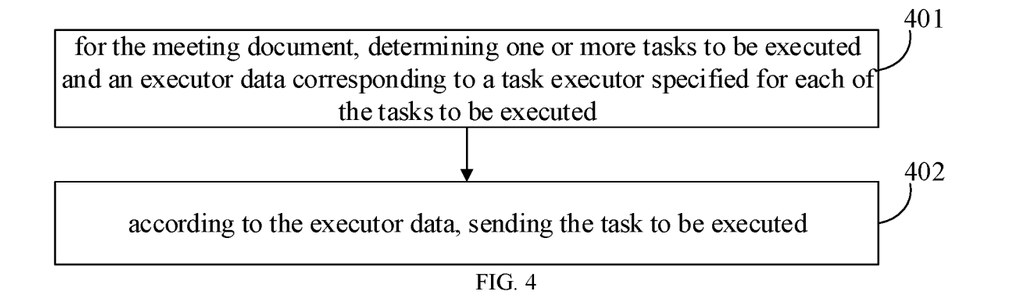
FIG. 4 schematically shows a flow chart of the process of assigning the tasks to be executed according to an embodiment of the present application.

Referring to FIG. 4, FIG. 4 shows a flow chart of the process of assigning the tasks to be executed according to an embodiment of the present application, which may particularly comprise the following steps:

Step 401: for the meeting document, determining one or more tasks to be executed and executor data corresponding to a task executor specified for each of the tasks to be executed.

In an embodiment of the present application, during the proceeding of the meeting or after the meeting has ended, regarding the generated meeting document, one or more tasks to be executed and executor data corresponding to a task executor specified for each of the tasks to be executed are automatically or artificially determined.

In an alternative embodiment, the step 401 comprises: receiving the one or more tasks to be executed for the meeting document and the executor data corresponding to the task executor specified for each of the tasks to be executed that are sent by a third client.

After the meeting has ended, the other participants may, by using the respective third clients, log in on the meeting managing page, and perform a viewing operation in the meeting managing page. Accordingly, the third client sends to the server a request of viewing the meeting document. The server, according to the request of viewing the meeting document, sends the meeting document to the corresponding third client. The third client receives the meeting document, and displays the meeting document. The process of logging in on the third client is similar to the process of logging in on the first client, and is not discussed here further.

A participant may enter corresponding left-word data in the meeting managing page of the third client, to publish his own opinion on this meeting. The third client sends the left-word data to the server. The server manages the contents of the current meeting in the mode of managing a forum, and when the other participants log in on the meeting managing page, they may view the left-word data.

The participants may also artificially enter corresponding tasks to be executed in the meeting managing page of the third client, and artificially select the executor data corresponding to the task executor specified for each of the tasks to be executed. Accordingly, after the meeting has ended, the third client sends to the server one or more tasks to be executed for the meeting document and the executor data corresponding to the task executor specified for each of the tasks to be executed. The server receives the one or more tasks to be executed for the meeting document and the executor data corresponding to the task executor specified for each of the tasks to be executed sent by the third client.

It should be noted that the meeting document may also be in real time generated during the proceeding of the meeting according to the data of the target participant and the voice data, and another related person may artificially enter corresponding tasks to be executed in the meeting managing page of the third client, and artificially select the executor data corresponding to the task executor specified for each of the tasks to be executed. Accordingly, during the proceeding of the meeting, the server receives the one or more tasks to be executed for the meeting document and the executor data corresponding to the task executor specified for each of the tasks to be executed sent by the third client.

In another alternative embodiment, the step 401 comprises: extracting from the meeting document one or more of the tasks to be executed, and the executor data of the task executor corresponding to each of the tasks to be executed.

During the proceeding of the meeting, the participant may directly perform task assignment on the meeting, and accordingly the voice data collected by the target microphone contains the tasks to be executed and the executor data. Accordingly, after the meeting document has been generated, the meeting document also contains the tasks to be executed and the executor data. The server directly automatically extracts one or more of the tasks to be executed from the meeting document, and the executor data of the task executor corresponding to each of the tasks to be executed.

In this case, the participant is not required to, by using the third client, log in on the meeting managing page, and enter the task to be executed and the executor data in the meeting managing page, which enables the task assignment to be simpler.

Certainly, in the practical usage, the executor data may also contain data of at least one participant; in other words, the task executor may be at least one of the participants participating in this meeting. Accordingly, the step 401 comprises: during proceeding of a meeting, for the meeting document, determining the one or more tasks to be executed and the executor data corresponding to the task executor specified for each of the tasks to be executed, wherein the executor data contains data of at least one participant.

During the proceeding of the meeting, the server may, according to one or more tasks to be executed and the executor data corresponding to the task executor specified for each of the tasks to be executed sent by the third client, or, one or more tasks to be executed and the executor data corresponding to the task executor specified for each of the tasks to be executed extracted by the server from the meeting document, determine the one or more tasks to be executed and the executor data corresponding to the task executor specified for each of the tasks to be executed, wherein the executor data contains data of at least one participant.

Step 402: according to the executor data, sending the task to be executed.

In an embodiment of the present application, after the task to be executed and the executor data have been obtained, the server, according to the executor data, sends the task to be executed to the task executor corresponding to the executor data.

Particularly, the step 402 comprises a sub-step S4021:

Sub-step S4021: sending the task to be executed to an electronic table card corresponding to the data of the participant in the executor data.

When, during the proceeding of the meeting, it is determined that the executor data contains data of at least one participant, or, in other words, the task executor is at least one of the participants participating in this meeting, the server determines the electronic-table-card identifier bound with the data of the participant in the executor data, and then sends the task to be executed to the electronic table card corresponding to the electronic-table-card identifier. Then, the electronic table card displays the task to be executed, so that the participant that is assigned the task to be executed can see the task to be executed from the electronic table card at the position where he is located, to enable the participant that is assigned the task to be executed to record in time the task to be executed assigned to him.

Particularly, the step 402 comprises a sub-step S4022:

Sub-step S4022: according to the executor data, sending the task to be executed to a fourth client corresponding to the task executor.

In an embodiment of the present application, the server, according to the executor data, determines the corresponding task executor, and in turn sends the assigned task to be executed to a fourth client corresponding to the task executor. The fourth client, after receiving the task to be executed, stores the task to be executed locally. Subsequently, after the task executor has logged in on the meeting managing page, the fourth client directly acquires the task to be executed stored locally, and displays the task to be executed. Accordingly, the task executor can view the assigned task to be executed.

Optionally, after the sub-step S4022, the method further comprises: receiving a task progress of the task to be executed sent by each of the fourth clients, wherein the task progress contains a task status; and when the task statuses of all of the tasks to be executed are a state of being already-completed, modifying a task-execution state for the meeting document into the state of being already-completed.

In an embodiment of the present application, the task executor handles the task to be executed, and enters in the meeting managing page the execution progress of the task to be executed. Accordingly, the fourth client sends the task progress of the task to be executed to the server. The server receives the task progress of the task to be executed sent by the fourth client.

The task progress contains the task status and the description on the progress of the task execution. The task status includes a state of being already-completed, a state of proceeding, a state of being not-handled, and so on.

After all of the task executors have completed the handling of the tasks to be executed, or, in other words, when all of the task statuses in the task progresses sent to the server by each of the fourth clients are the state of being already-completed, the server determines that all of the task statuses of the tasks to be executed are the state of being already-completed, and automatically modifies the task-execution state of the meeting document from the state of being not-completed into the state of being already-completed.

Assuming that merely the task statuses of some of the tasks to be executed are the state of being already-completed, and the task statuses of some of the tasks to be executed are the state of being not-handled or the state of proceeding, the task-execution state of the meeting document is still the state of being not-completed.

By sending by the fourth client to the server the task progress of each of the tasks to be executed, the other persons can, by logging in on the meeting managing page, know in time the task progress of each of the tasks to be executed.

It should be noted that the step 401 and the step 402 are executed sequentially after the step 105. Furthermore, the first client, the second client, the third client and the fourth client may be the same one client, and may also be different clients.

The third client and the fourth client according to the embodiment of the present application may be a browser or application program deployed in a terminal device, wherein the application program may be an application program for meeting management, and may also be another application program for message notification, for example, a mailbox application program.

In the embodiments of the present application, the data of the participant and the electronic-table-card identifiers are in advance bound, and the electronic table cards corresponding to the electronic-table-card identifiers correspond to the microphones one to one; during the proceeding of the meeting, according to the target microphone that sends the voice data, the target-electronic-table-card identifier of the target electronic table card corresponding to the target microphone is determined, and in turn the data of the target participant of the target participant that emits the voice data is determined; and, finally, according to the data of the target participant and the voice data, the meeting document is directly generated. The generated meeting document does not require the worker to manually collate, which saves the working time of the worker, increases the efficiency of the collation of the meeting document, and prevents incomplete recording of the meeting contents. Furthermore, the target participant corresponding to each of the voice data can be identified, and in the meeting document, the data of the target participant corresponding to each of the voice data can be automatically marked, which prevents that, subsequently in the viewing of the meeting document, the target participant corresponding to each of the voice data is not clearly known, and enables the generated meeting document to be clearer. Moreover, by the cooperative utilization of the second client, the server and the specified electronic table card, events to be handled can be handled in time during the proceeding of the meeting, which prevents delay of the handling of the events to be handled due to the meeting. During the proceeding of the meeting or after the meeting has ended, task assignment can be performed with respect to the meeting document, to facilitate the task executors to know the tasks to be executed assigned to them.

Figure 5:
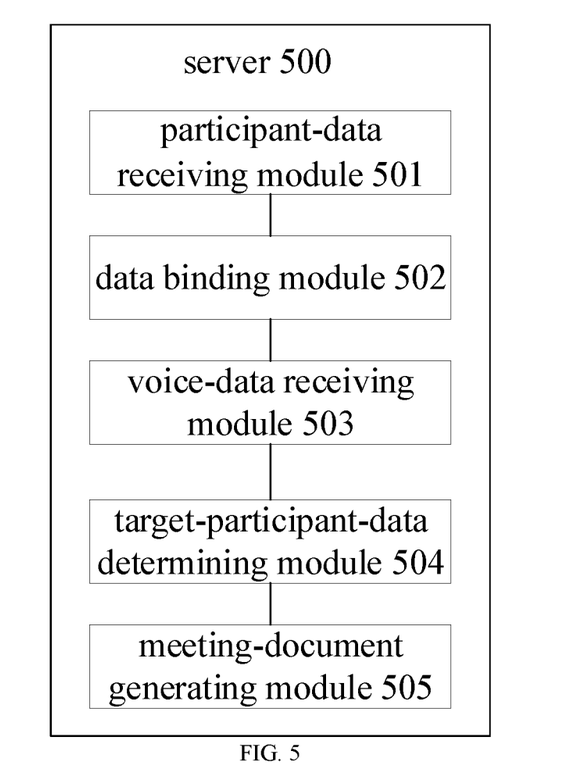
FIG. 5 schematically shows a structural block diagram of the server according to an embodiment of the present application.

Referring to FIG. 5, FIG. 5 shows a structural block diagram of the server according to an embodiment of the present application.

The server 500 according to an embodiment of the present application comprises:
 a participant-data receiving module 501 configured for receiving data of a plurality of participants sent by a first client;
 a data binding module 502 configured for binding data of each participant in the plurality of participants with a corresponding electronic-table-card identifier, wherein electronic table cards corresponding to each of the electronic-table-card identifiers correspond to microphones one to one;
 a voice-data receiving module 503 configured for receiving a voice data collected by at least one target microphone;
 a target-participant-data determining module 504 configured for, according to a target-electronic-table-card identifier of a target electronic table card corresponding to the target microphone, determining data of the target participant bound with the target-electronic-table-card identifier; and
 a meeting-document generating module 505 configured for, according to the voice data and the data of the target participant, generating a meeting document.

Optionally, the meeting-document generating module 505 comprises:
 a text-data generating submodule configured for converting the voice data, to generate text data; and
 a meeting-document generating submodule configured for, according to the data of the target participant and the text data, generating the meeting document.

Optionally, the server 500 further comprises:
 a participant-changing-data receiving module configured for receiving a participant-changing data sent by the first client, wherein the participant-changing data contains a target-input-box identifier and data of the participant that has been changed that is inputted in a target input box corresponding to the target-input-box identifier; and
 a participant-data modifying module configured for modifying data of the participant to be changed that is in advance inputted in the target input box corresponding to the target-input-box identifier into the data of the participant that has been changed, and binding the data of the participant that has been changed with an electronic-table-card identifier corresponding to the data of the participant to be changed.

Optionally, the server 500 further comprises:

a target-message receiving module configured for, during proceeding of a meeting, receiving a target message and data of the specified-participant corresponding to the target message that are sent by a second client;

a specified-electronic-table-card-identifier determining module configured for determining a specified-electronic-table-card identifier bound with the data of the specified-participant; and a target-message sending module configured for sending the target message to a specified electronic table card corresponding to the specified-electronic-table-card identifier.

Optionally, the server 500 further comprises:

a receipt-message receiving module configured for receiving a receipt message sent by the specified electronic table card; and a receipt-message sending module configured for sending the receipt message to the second client.

Optionally, the server 500 further comprises:

a controlling-instruction sending module configured for, after a receipt message sent by the specified electronic table card has not been received within a preset duration, sending a controlling instruction to the specified electronic table card, to control an indicator lamp on the specified electronic table card to emit light.

Optionally, the server 500 further comprises:

a task assigning module configured for, for the meeting document, determining one or more tasks to be executed and executor data corresponding to a task executor specified for each of the tasks to be executed; and a task-to-be-executed sending module configured for, according to the executor data, sending the task to be executed.

Optionally, the task assigning module comprises:

a task assigning submodule configured for, during proceeding of a meeting, for the meeting document, determining the one or more tasks to be executed and the executor data corresponding to the task executor specified for each of the tasks to be executed, wherein the executor data contains data of at least one participant; and the task-to-be-executed sending module comprises:

a first task-to-be-executed sending submodule configured for sending the task to be executed to an electronic table card corresponding to the data of the participant in the executor data.

Optionally, the task assigning module comprises:

a task-to-be-executed receiving submodule configured for receiving the one or more tasks to be executed for the meeting document and the executor data corresponding to the task executor specified for each of the tasks to be executed that are sent by a third client;

or, a task-to-be-executed extracting submodule configured for extracting from the meeting document one or more of the tasks to be executed, and the executor data of the task executor corresponding to each of the tasks to be executed.

Optionally, the task-to-be-executed sending module comprises:

a second task-to-be-executed sending submodule configured for, according to the executor data, sending the task to be executed to a fourth client corresponding to the task executor; and the server 500 further comprises:

a task-progress receiving module configured for receiving a task progress of the task to be executed sent by each of the fourth clients, wherein the task progress contains a task status; and a task-execution-state modifying module configured for, when the task statuses of all of the tasks to be executed are a state of being already-completed, modifying a task-execution state for the meeting document into the state of being already-completed.

Optionally, the server 500 further comprises:

an associated-user-data extracting module configured for, according to the meeting document, extracting an associated-user data corresponding to an associated user associated with this meeting, wherein the associated-user data contains the data of the participant and user data corresponding to a user involved in the meeting; and a meeting-document sending module configured for, according to the associated-user data, sending the meeting document.

In the embodiments of the present application, the data of the participant and the electronic-table-card identifiers are in advance bound, and the electronic table cards corresponding to the electronic-table-card identifiers correspond to the microphones one to one; during the proceeding of the meeting, according to the target microphone that sends the voice data, the target-electronic-table-card identifier of the target electronic table card corresponding to the target microphone is determined, and in turn the data of the target participant of the target participant that emits the voice data is determined; and, finally, according to the data of the target participant and the voice data, the meeting document is directly generated. The generated meeting document does not require the worker to manually collate, which saves the working time of the worker, increases the efficiency of the collation of the meeting document, and prevents incomplete recording of the meeting contents. Furthermore, the target participant corresponding to each of the voice data can be identified, and in the meeting document, the data of the target participant corresponding to each of the voice data can be automatically marked, which prevents that, subsequently in the viewing of the meeting document, the target participant corresponding to each of the voice data is not clearly known, and enables the generated meeting document to be clearer.

Correspondingly, an embodiment of the present application further provides a server, wherein the server comprises a processor, a memory and a computer program that is stored in the memory and is executable in the processor, and the computer program, when executed by the processor, implements the steps of the meeting managing method stated above.

An embodiment of the present application further provides a computer-readable medium, wherein the computer-readable storage medium stores a computer program, and the computer program, when executed by a processor, implements the steps of the meeting managing method stated above.

An embodiment of the present application further provides a meeting managing system, wherein the system comprises electronic table cards, a microphone, a first client and the server 500 stated above;

the electronic table cards are configured for displaying data of the participant bound with electronic-table-card identifiers corresponding to the electronic table cards;

the microphone is configured for collecting voice data emitted by a target participant corresponding to the data of the target participant; and the first client is configured for sending data of the plurality of participants to the server.

In an embodiment of the present application, before the meeting begins, it is required to perform meeting appointment. At this point, the worker logs in on the meeting managing page by using the first client, skips to the meeting appointing page, and enters data of the plurality of participants in the meeting appointing page. The first client sends the data of the plurality of participants to the server, to realize the binding between the data of the participant and the electronic-table-card identifiers by the server. The data of the participant include the participant name, the mailbox account of the participant, the participant position, the title of the department that the participant belongs to and the title of the company that the participant belongs to.

Before the meeting begins, when the time difference from the meeting starting time is equal to a preset time difference, the server sends the data of the participant bound with each of the electronic-table-card identifiers to the electronic table card corresponding to that electronic-table-card identifier, and accordingly the electronic table card displays the data of the participant bound with the electronic-table-card identifier corresponding to the electronic table card.

During the proceeding of the meeting, the target participant makes a speech with respect to the meeting topic. Accordingly, a target microphone at the position where the target participant is located collects the voice data emitted by the target participant. Subsequently, the target microphone sends the voice data to the server. Accordingly, the server generates the meeting document according to the voice data and the data of the target participant.

Optionally, the meeting managing system further comprises a second client, a third client and a fourth client;

the second client is configured for sending to the server a target message and data of the specified-participant corresponding to the target message, and receiving a receipt message sent by the server;

the third client is configured for sending to the server one or more tasks to be executed for the meeting document and executor data corresponding to a task executor specified for each of the tasks to be executed;

the fourth client is configured for receiving the task to be executed sent by the server, and sending to the server a task progress of the task to be executed;

the first client is further configured for sending participant-changing data to the server; and the electronic table cards are further configured for displaying the target message and the task to be executed sent by the server; and sending a receipt message to the server, and/or, according to a controlling instruction sent by the server, controlling an indicator lamp on the electronic table card to emit light.

Before the meeting begins or during the proceeding of the meeting, if the participants change temporarily, the worker logs in on the meeting appointing page by using the first client, and modifies the data of the participant in the meeting appointing page. Accordingly, the first client sends the participant-changing data to the server. Accordingly, the server modifies the data of the participant to be changed into the data of the participant that has been changed, and binds the data of the participant that has been changed with an electronic-table-card identifier corresponding to the data of the participant to be changed.

During the proceeding of the meeting, when there is an event to be handled and it is required to notify a participant, in order to prevent disturbing the meeting order, the message sender, by using a second client, logs in on the meeting managing page, selects the data of the specified-participant in the meeting managing page, and enters in the meeting managing page the target message to be notified. Accordingly, the second client sends to the server a target message and data of the specified-participant corresponding to the target message. The server, according to the data of the specified-participant, determines the specified-electronic-table-card identifier bound with it, and sends the target message to the specified electronic table card corresponding to the specified-electronic-table-card identifier. Accordingly, the specified electronic table card receives and displays the target message sent by the server.

Subsequently, the specified participant may perform opinion replying with respect to the target message. The specified electronic table card sends to the server a receipt message of the specified participant. The server sends the receipt message to the second client. Accordingly, the second client can receive the receipt message sent by the server. Certainly, the specified participant might not notice the target message. If the server does not receive, within a preset duration, the receipt message sent by the specified electronic table card, it is determined that the specified participant did not see the target message in time, and accordingly the server sends a controlling instruction to the specified electronic table card. The specified electronic table card, according to the controlling instruction sent by the server, controls an indicator lamp on the specified electronic table card to emit light. The specified electronic table card may be any one or more electronic table cards used in the meeting.

During the proceeding of the meeting, the server determines one or more tasks to be executed and executor data corresponding to the task executor specified for each of the tasks to be executed, wherein the executor data contains data of at least one participant. Accordingly, the server determines the electronic-table-card identifier bound with the data of the participant in the executor data, and then sends the task to be executed to the electronic table card corresponding to the electronic-table-card identifier. The electronic table card receives the task to be executed sent by the server, and displays the task to be executed.

Alternatively, during the proceeding of the meeting or after the meeting has ended, the participants or the other workers, by using the respective third clients, log in on the meeting managing page, enter the corresponding task to be executed in the meeting managing page of the third client, and select the executor data corresponding to the task executor specified for each of the tasks to be executed. Accordingly, the third client sends to the server one or more tasks to be executed for the meeting document and the executor data corresponding to the task executor specified for each of the tasks to be executed. The server, according to the executor data sent by the third client, determines the corresponding task executor, and in turn sends the assigned task to be executed to a fourth client corresponding to the task executor. The fourth client receives the task to be executed sent by the server.

The task executor handles the task to be executed, and enters in the meeting managing page the execution progress of the task to be executed. Accordingly, the fourth client sends the task progress of the task to be executed to the server.

In the embodiments of the present application, the data of the participant and the electronic-table-card identifiers are in advance bound, and the electronic table cards corresponding to the electronic-table-card identifiers correspond to the microphones one to one; during the proceeding of the meeting, according to the target microphone that sends the voice data, the target-electronic-table-card identifier of the target electronic table card corresponding to the target microphone is determined, and in turn the data of the target participant of the target participant that emits the voice data is determined; and, finally, according to the data of the target participant and the voice data, the meeting document is directly generated. The generated meeting document does not require the worker to manually collate, which saves the working time of the worker, increases the efficiency of the collation of the meeting document, and prevents incomplete recording of the meeting contents. Furthermore, the target participant corresponding to each of the voice data can be identified, and in the meeting document, the data of the target participant corresponding to each of the voice data can be automatically marked, which prevents that, subsequently in the viewing of the meeting document, the target participant corresponding to each of the voice data is not clearly known, and enables the generated meeting document to be clearer.

Regarding the device embodiments, because they are substantially similar to the process embodiments, they are described simply, and the related parts may refer to the description on the process embodiments.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

Each component embodiment of the present application may be implemented by hardware, or by software modules that are operated on one or more processors, or by a combination thereof. A person skilled in the art should understand that some or all of the functions of some or all of the components of the server according to the embodiments of the present application may be implemented by using a microprocessor or a digital signal processor (DSP) in practice. The present application may also be implemented as apparatus or device programs (for example, computer programs and computer program products) for implementing part of or the whole of the method described herein. Such programs for implementing the present application may be stored in a computer-readable medium, or may be in the form of one or more signals. Such signals may be downloaded from an Internet website, or provided on a carrier signal, or provided in any other forms.

Figure 6:
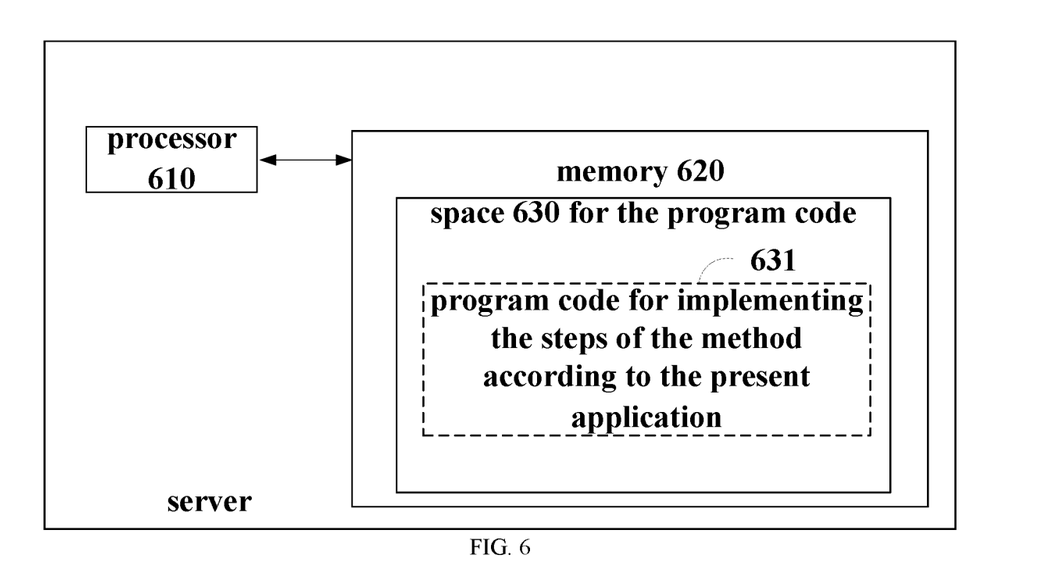
FIG. 6 schematically shows a block diagram of a server for implementing the method according to the present application.
Figure 7:
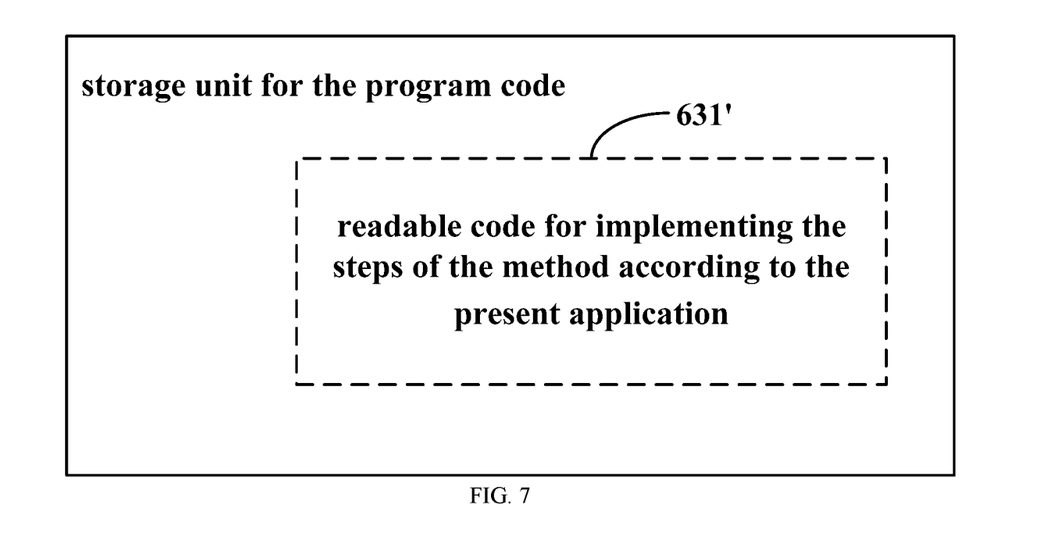
FIG. 7 schematically shows a storage unit for maintaining or carrying a program code for implementing the method according to the present application.

For example, FIG. 6 shows a server that can implement the method according to the present application. The server traditionally comprises a processor 610 and a computer program product or computer-readable medium in the form of a memory 620. The memory 620 may be electronic memories such as flash memory, EEPROM (Electrically Erasable Programmable Read Only Memory), EPROM, hard disk or ROM. The memory 620 has the storage space 630 of the program code 631 for implementing any steps of the above method. For example, the storage space 630 for program code may contain program codes 631 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 7. The storage unit may have storage segments or storage spaces with similar arrangement to the memory 620 of the server in FIG. 6. The program codes may, for example, be compressed in a suitable form. Generally, the storage unit contains a computer-readable code 631', which can be read by a processor like 610. When those codes are executed by the server, the codes cause the server to implement each of the steps of the method described above.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present application, and not to limit them. Although the present application is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A meeting managing method, wherein the method is applied to a server, and the method comprises:
   receiving data of a plurality of participants sent by a first client;
   binding data of each participant in the plurality of participants with a corresponding electronic-table-card identifier, wherein electronic table cards corresponding to each of the electronic-table-card identifiers correspond to microphones one to one;
   receiving voice data collected by at least one target microphone;

according to a target-electronic-table-card identifier of a target electronic table card corresponding to the target microphone, determining data of a target participant bound with the target-electronic-table-card identifier; and according to the voice data and the data of the target participant, generating a meeting document;

wherein after the step of binding data of each participant in the plurality of participants with the corresponding electronic-table-card identifier, the method further comprises:

during proceeding of a meeting, receiving a target message and data of a specified-participant corresponding to the target message that are sent by a second client;

determining a specified-electronic-table-card identifier bound with the data of the specified-participant; and sending the target message to a specified electronic table card corresponding to the specified-electronic-table-card identifier, wherein each of the electronic table cards comprises a first display screen and a second display screen that are arranged oppositely, the first display screen faces away from the participant, the second display screen faces the participant, and the target message is displayed by the second display screen.

2. The method according to claim 1, wherein the step of, according to the voice data and the data of the target participant, generating the meeting document comprises:

converting the voice data, to generate text data; and according to the data of the target participant and the text data, generating the meeting document.

3. The method according to claim 1, wherein before the step of receiving the voice data sent by the target microphone, the method further comprises:

receiving participant-changing data sent by the first client, wherein the participant-changing data contains a target-input-box identifier and data of a participant that has been changed that is inputted in a target input box corresponding to the target-input-box identifier; and modifying data of a participant to be changed that is in advance inputted in the target input box corresponding to the target-input-box identifier into the data of the participant that has been changed, and binding the data of the participant that has been changed with an electronic-table-card identifier corresponding to the data of the participant to be changed.

4. The method according to claim 1, wherein after the step of sending the target message to the specified electronic table card corresponding to the specified-electronic-table-card identifier, the method further comprises:

receiving a receipt message sent by the specified electronic table card; and sending the receipt message to the second client.

5. The method according to claim 1, wherein after the step of sending the target message to the specified electronic table card corresponding to the specified-electronic-table-card identifier, the method further comprises:

after a receipt message sent by the specified electronic table card has not been received within a preset duration, sending a controlling instruction to the specified electronic table card, to control an indicator lamp on the specified electronic table card to emit light.

6. The method according to claim 1, wherein after the step of, according to the voice data and the data of the target participant, generating the meeting document, the method further comprises:

for the meeting document, determining one or more tasks to be executed and executor data corresponding to a task executor specified for each of the tasks to be executed; and according to the executor data, sending the task to be executed.

7. The method according to claim 6, wherein the step of, for the meeting document, determining the one or more tasks to be executed and the executor data corresponding to the task executor specified for each of the tasks to be executed comprises:

during proceeding of a meeting, for the meeting document, determining the one or more tasks to be executed and the executor data corresponding to the task executor specified for each of the tasks to be executed, wherein the executor data contains data of at least one participant; and the step of, according to the executor data, sending the task to be executed comprises:

sending the task to be executed to an electronic table card corresponding to the data of the participant in the executor data.

8. The method according to claim 6, wherein the step of, for the meeting document, determining the one or more tasks to be executed and the executor data corresponding to the task executor specified for each of the tasks to be executed comprises:

receiving the one or more tasks to be executed for the meeting document and the executor data corresponding to the task executor specified for each of the tasks to be executed that are sent by a third client;

or, extracting from the meeting document one or more of the tasks to be executed, and the executor data of the task executor corresponding to each of the tasks to be executed.

9. The method according to claim 6, wherein the step of, according to the executor data, sending the task to be executed comprises:

according to the executor data, sending the task to be executed to a client corresponding to the task executor; and after the step of, according to the executor data, sending the task to be executed to the client corresponding to the task executor, the method further comprises:

receiving a task progress of the task to be executed sent by the client, wherein the task progress contains a task status; and when the task statuses of all of the tasks to be executed are a state of being already-completed, modifying a task-execution state for the meeting document into the state of being already-completed.

10. The method according to claim 1, wherein after the step of, according to the voice data and the data of the target participant, generating the meeting document, the method further comprises:

according to the meeting document, extracting associated-user data corresponding to an associated user associated with this meeting, wherein the associated-user data contains the data of the participant and user data corresponding to a user involved in the meeting; and according to the associated-user data, sending the meeting document.

11. The method according to claim 2, wherein converting the voice data, to generate text data further comprises:

converting the voice data according to a predetermined language type, to generate the text data corresponding to the predetermined language type; or converting the voice data according to the target language types corresponding to the received voice data sent by all of the target microphones, to generate the text data corresponding to the target language types.

12. The method according to claim 10, wherein after sending the meeting document, the method further comprises:

collating the meeting document in the first client, and extracts the key contents in the meeting document to obtain minutes of meeting, and the first client then sends the final generated minutes of meeting to the server;

sending the minutes of meeting, by the first client, according to the determined associated-user data; or the associated users, by using the respective clients, log in on the meeting managing page, and send to the server a request of viewing the minutes of meeting, to view the minutes of meeting.

13. A server, wherein the server comprises a processor, a memory and a computer program that is stored in the memory and is executable in the processor, and the computer program, when executed by the processor, implements operations comprising:

receiving data of a plurality of participants sent by a first client;

binding data of each participant in the plurality of participants with a corresponding electronic-table-card identifier, wherein electronic table cards corresponding to each of the electronic-table-card identifiers correspond to microphones one to one;

receiving voice data collected by at least one target microphone;

according to a target-electronic-table-card identifier of a target electronic table card corresponding to the target microphone, determining data of a target participant bound with the target-electronic-table-card identifier; and according to the voice data and the data of the target participant, generating a meeting document;

wherein after the operation of binding data of each participant in the plurality of participants with the corresponding electronic-table-card identifier, the method further comprises:

during proceeding of a meeting, receiving a target message and data of a specified-participant corresponding to the target message that are sent by a second client;

determining a specified-electronic-table-card identifier bound with the data of the specified-participant; and sending the target message to a specified electronic table card corresponding to the specified-electronic-table-card identifier, wherein each of the electronic table cards comprises a first display screen and a second display screen that are arranged oppositely, the first display screen faces away from the participant, the second display screen faces the participant, and the target message is displayed by the second display screen.

14. A meeting managing system, wherein the system comprises electronic table cards, a microphone, a first client and a server according to claim 13 the electronic table cards are configured for displaying participant data bound with electronic-table-card identifiers corresponding to the electronic table cards;

the microphone is configured for collecting a voice datum emitted by a target participant corresponding to the target participant datum; and the first client is configured for sending the plurality of participant data to the server.

15. The system according to claim 14, wherein the meeting managing system further comprises a second client, a third client and a fourth client;

the second client is configured for sending to the server a target message and data of a specified-participant corresponding to the target message, and receiving a receipt message sent by the server;

the third client is configured for sending to the server one or more tasks to be executed for the meeting document and executor data corresponding to a task executor specified for each of the tasks to be executed;

the fourth client is configured for receiving the task to be executed sent by the server, and sending to the server a task progress of the task to be executed;

the first client is further configured for sending participant-changing data to the server; and the electronic table cards are further configured for displaying the target message and the task to be executed sent by the server; and sending a receipt message to the server, and/or, according to a controlling instruction sent by the server, controlling an indicator lamp on the electronic table card to emit light.

16. The sever according to claim 13, wherein the operation according to the voice data and the data of the target participant, generating the meeting document comprises:

converting the voice data, to generate text data; and
according to the data of the target participant and the text data, generating the meeting document.

17. The sever according to claim 13, wherein before the operation of receiving the voice data sent by the target microphone, the method further comprises:

receiving participant-changing data sent by the first client, wherein the participant-changing data contains a target-input-box identifier and data of a participant that has been changed that is inputted in a target input box corresponding to the target-input-box identifier; and modifying data of a participant to be changed that is in advance inputted in the target input box corresponding to the target-input-box identifier into the data of the participant that has been changed, and binding the data of the participant that has been changed with an electronic-table-card identifier corresponding to the data of the participant to be changed.

\* \* \* \* \*